(12) United States Patent
Werner et al.

(10) Patent No.: US 8,699,140 B2
(45) Date of Patent: Apr. 15, 2014

(54) FLAT TRANSFORMATIONAL ELECTROMAGNETIC LENSES

(75) Inventors: Douglas H. Werner, State College, PA (US); Do-Hoon Kwon, Amherst, MA (US)

(73) Assignee: The Penn State Research Foundation, University Park, PA (US)

( * ) Notice: Subject to any disclaimer, the term of this patent is extended or adjusted under 35 U.S.C. 154(b) by 267 days.

(21) Appl. No.: 12/474,632

(22) Filed: May 29, 2009

(65) Prior Publication Data

US 2009/0296223 A1    Dec. 3, 2009

Related U.S. Application Data

(60) Provisional application No. 61/057,416, filed on May 30, 2008.

(51) Int. Cl.
*G02B 3/00* (2006.01)

(52) U.S. Cl.
CPC ................................. *G02B 3/0087* (2013.01)
USPC ........................................ 359/652; 359/654

(58) Field of Classification Search
USPC ................................................ 359/652–654
See application file for complete search history.

(56) References Cited

U.S. PATENT DOCUMENTS

| | | | | |
|---|---|---|---|---|
| 4,639,094 A | * | 1/1987 | Aono | 359/654 |
| 4,805,997 A | * | 2/1989 | Asahara et al. | 359/652 |
| 6,088,153 A | * | 7/2000 | Anthon et al. | 359/341.32 |
| 7,570,432 B1 | * | 8/2009 | Yonak | 359/652 |
| 2002/0150333 A1 | | 10/2002 | Reed et al. | |
| 2007/0065068 A1 | | 3/2007 | Wang | |
| 2008/0024792 A1 | | 1/2008 | Pendry et al. | |
| 2009/0190231 A1 | * | 7/2009 | Lenchenkov | 359/654 |

OTHER PUBLICATIONS

J.B. Pendy, "Negative refraction makes a perfect lens," *Phys. Rev. Lett.*, vol. 85, No. 18, pp. 3966-3969, 2000.
J.B. Pendy, D. Schurig, D.R. Smith, "Controlling electromagnetic fields," *Science*, vol. 312, pp. 1780-1782, Jun. 2006.
D. Schurig, J.B. Pendry, D.R. Smith, "Calculation of material properties and ray tracing in transformation media," *Opt. Express*, vol. 14, No. 21, pp. 9794-9804, 2006.
G.W. Milton, M. Briane, J.R. Willis, "On cloaking for elasticity and physical equations with a transformation invariant form," *New J. Phys.*, vol. 8, 248, 2006.
J.B. Pendy, D. Schurig, D.R. Smith, "Controlling electromagnetic fields," *Sciencexpress*, May 25, 2006.
Xie, et al., GRIN lens rod based probe for endoscopic spectral domain optical coherence tomography with fast dynamic focus tracking, Optics Express, 14(8): 3238-3246, 2006.

* cited by examiner

*Primary Examiner* — William Choi
(74) *Attorney, Agent, or Firm* — Gifford, Krass, Sprinkle, Anderson & Citkowski, P.C.

(57) ABSTRACT

Examples of the present invention include methods and apparatus for modification of electromagnetic waves, including lenses with generally parallel flat surfaces. Lenses may comprise metamaterials, dielectric materials (such as glass), plastics, and the like. Lenses may have an index profile corresponding to a coordinate transformation for the desired effect on the electromagnetic waves.

21 Claims, 10 Drawing Sheets

FLAT TRANSFORMATIONAL ELECTROMAGNETIC LENSES

REFERENCE TO RELATED APPLICATION

This application claims priority from U.S. Provisional Application Ref. No. U.S. Ser. No. 61/057,416, filed May 30, 2008, the entire content of which is incorporated herein by reference.

REFERENCE TO GOVERNMENT SPONSORSHIP

This invention was made with government support under Grant No. DMR 0213623, awarded by the National Science Foundation and Contract No. W911NF-06-1-0377, awarded by the Army/ARO (Purdue Subcontract No. 531-0898-01. The government has certain rights in the invention.

BACKGROUND OF THE INVENTION

Conventional lenses, such as glass optical lenses, have curved surfaces. The combination of an index difference across an interface and the curvature of the interface allows refraction and focusing to be achieved. Conventional lenses with curved boundaries can provide conversion between diverging, planar, and converging electromagnetic and light waves. This manipulation of wave propagation is achieved by the careful choice of lens material and of the geometrical interface between air and the lens material. By designing the air-lens interface in properly chosen convex, planar, and concave shapes, the direction of wave propagation can be manipulated.

SUMMARY OF THE INVENTION

Examples of the present invention include lenses having a planar first face and a planar second face, the lens comprising a positive index lens material. The first and second faces may be generally parallel, so that the lens is a flat lens having generally parallel flat faces.

In conventional lenses, the focusing effect is due to a combination of refraction at the lens faces and curvature of the lens faces. In some examples of the present invention, the focusing effect is due to an index profile within the lens material, such as a spatial variation of one or more permittivity and/or permeability components. The index profile for a given lens behavior can be determined using a transformation optics approach.

An example lens may comprise a parallel-sided slab of the lens material having an internal index profile configured to converge or diverge an electromagnetic radiation beam passing through the lens. The lens material may be chosen so that the lens operates at a desired electromagnetic frequency, or within a desired frequency range. The lens may comprise an optical material, dielectric material, metamaterial (e.g. an artificial composite having spatially controllable index properties), or other material.

The lens, or other element, may have an index profile determined using, and correlated with, a continuous conformal coordinate transformation. Examples of the present invention include methods of designing a lens, such as a flat lens, using a coordinate transformation approach. The material used to fabricate a lens or other element may be a positive index material.

Examples of the present invention include a lens having a first face and a second face, the first face and second face being generally flat, the lens being operable to modify electromagnetic radiation passing through the lens, modification of the electromagnetic radiation being achieved through an index profile within the lens. The lens may comprise a slab of lens material having generally parallel faces.

Some example lenses of the present invention act as converging lenses, for example able to focus radiation from distant and/or near sources to a focus. A converging lens may have an internal index profile configured to converge an electromagnetic radiation beam passing through the lens. For example, an input parallel radiation beam may enter an input face of the lens, and a converging beam exits from the output face.

Examples include a flat lens that converts diverging cylindrical or spherical waves into planar waves. Reciprocity allows the same lens under a plane wave illumination at normal incidence to forms an image at the focal point. One or more flat lenses can be designed that form an image of a source close to the lens interface on the opposite side of the lens in the near field. For example, if two far-zone focusing lenses are arranged in a back-to-back configuration in front of a source, the first lens will transform the diverging cylindrical waves into planar waves, and the second lens will convert the planar waves into converging cylindrical waves to form an image in the near field. A single lens may also be formed having this function.

Some examples of the present invention include a radiation source and a lens, the lens being configured so as to collimate radiation from the radiation source. The lens and source can be configured so as to produce a radiation having a generally planar wavefront, even if the source otherwise would not produce such a wavefront.

The radiation source may be an antenna (for example, a radio antenna, radar antenna, wireless phone antenna, and the like), THz antenna, or other antenna. Examples also include radiation detectors, using similar or other antennas. In some examples, the radiation source may be an optical source (e.g. one or more from IR, visible, or UV), such as a visible light source. Examples include improved lasers or other optical systems.

Examples of the present invention include improved lenses and optical instruments including such lenses, such as spectrometers, imaging devices (e.g. cameras), spectacles, microscopes, binoculars, lighting systems, and the like. Examples include radiation receivers in which the lens acting as a focusing element, for example an imaging element. Examples also include improved high power radiation systems, such as industrial laser equipment.

Examples of the present invention include improved wireless devices, such as radar, cellphones, wireless network equipment, directional wireless communication equipment, and the like.

An example apparatus, such as a lens or other radiation controlling or modifying device, may include an internal positive index profile configured to modify an electromagnetic beam as the electromagnetic beam passes through the lens. The apparatus may generate, receive, control, and/or modify a radiation beam. For example, the apparatus may include an element having a first face and a second face, the first and second faces being planar and parallel to each other, the apparatus having an internal index profile configured to converge, diverge, redirect, or otherwise modify the radiation beam. Example apparatus include lenses, radiation redirection devices, beam steering devices, radiation sources, radiation receivers, imaging devices, and the like.

Examples of the present invention further include methods and apparatus for beam propagation through a right-angle bend or other beam redirection angle, and other beam steering applications. A beam redirection device may redirect a radiation beam through any designed angle. A representative device has a beam redirection angle of 90 degrees, the first face being orthogonal to the second face. For example, a beam may enter the first face in a direction normal to the first face, be redirected by an angle determined by the internal index profile of the material, and exit through the second face in a direction normal to the second face.

A method of designing an element, such as a flat lens or beam redirector, for modifying a beam of radiation comprises determining a spatial coordinate transformation required to modify the beam of radiation, and determining the index profile of the element using the spatial coordinate transformation. The element may be a flat lens having a planar input face and a planar output face. The lens may be a converging lens such as a collimator, a diverging lens, or other lens assembly.

BRIEF DESCRIPTION OF THE DRAWINGS

FIG. 1A shows the original coordinate system, and FIG. 1B shows a transformed coordinate system.

FIG. 3A shows an electric line source radiating in free space and FIG. 3B shows a line source embedded in the flat lens of transformation medium.

FIG. 4A shows the original coordinate system in free space, and FIG. 4B shows the transformed coordinate system.

FIG. 5A shows an electric line source radiating in free space from the coordinate origin, and FIG. 5B shows a line source radiating in the presence of a flat lens converting the cylindrical wave into a planar wave propagating in the +y direction.

DETAILED DESCRIPTION

Figure 1A:
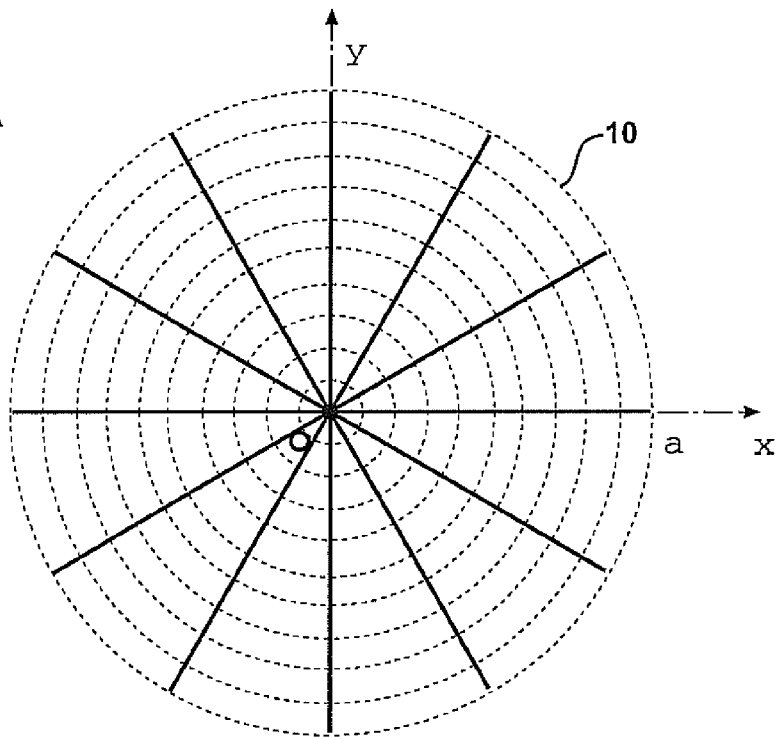
FIGS. 1A and 1B illustrate coordinate systems for the two-dimensional flat lens which converts a cylindrical wave to a planar wave, where

Embodiments of the present invention include lenses having planar shapes, such as lenses comprising flat parallel-sided slabs of lens material. The term "flat lens" is used here to refer to a lens having flat faces, such as a flat first face and/or a flat second face. In some examples, a flat lens comprises a flat slab of material having generally parallel flat faces. Flat lenses according to the present invention may be used to converge a planar beam of radiation to a focal point, to converge a diverging beam of radiation (e.g. originating from a radiation source such as a point or line source) to a planar beam, or to focus radiation from an electromagnetic source. For example, an example lens can be used to focus a diverging wave of cylindrical or spherical phase fronts to a point in the far zone or the near zone.

Example lenses provide focusing functions in a planar geometry. Examples of the present invention include lens designs that provide conversions between diverging, planar, and converging waves. Lenses may have generally flat geometries, for example comprising parallel-sided slabs of material, and lenses according to the present invention may comprise positive index materials, such as materials having a positive refractive index at the wavelength(s) of operation.

A transformation optics technique can be used to determine the required values of permittivity and the permeability tensors for novel devices. The device design can be obtained via a spatial coordinate transformation from the original free space to the transformed space, where the compression and dilation of space in different coordinate directions are interpreted as appropriate scaling of the material parameters (i.e. the permittivity and the permeability tensors).

Example devices such as a wave collimator lens, far-zone and near-zone focusing flat lenses, and a right-angle bend for propagating beam fields were designed. An example wave collimator lens comprises an element in which the fields (e.g. cylindrical or spherical waves) radiated by an embedded radiation source emerge normal to the top (and optionally bottom) planar interfaces of the element, thereby producing highly directive collimated fields. A radiation source may be embedded in, adjacent to, or proximate a collimating lens.

A far-zone focusing lens for a radiation source can be designed by transforming the equi-amplitude equi-phase contour to a planar surface. By aligning two far-zone focusing flat lenses in a back-to-back configuration (optionally in a unitary lens structure), a near-zone focusing lens is obtained, which can focus radiation from a nearby source to a focus.

Lenses may comprise a material having an index profile that accomplishes convergence (or divergence) of radiation, without the need for curved surfaces as required by conventional lenses. Refractive effects may be due to an index profile within the lens material, which can be configured so as to obtain the desired beam modification (such as focus, planar parallel beam formation, or other desired output beam). Conventional lenses require refraction at the lens interface, and there is generally insignificant refraction within the lens material, away from lens interfaces. In examples of the present invention, the majority of refractive effects may occur within the lens, compared with the effects of an external interface.

The index profile of a flat lens can be calculated through a spatial coordinate transformation technique, sometimes referred to as the transformation optics technique. The reflection at a flat lens interface can be minimized to a level lower than those of conventional curved lenses. In some examples, reflection power may be negligible compared with transmitted power (e.g. less than 1% of transmitted power).

Lenses according to embodiments of the invention do not require any negative electric permittivity and/or magnetic permeability values, which provides a significant advantage for fabrication. Negative materials may be relatively difficult to manufacture or obtain at a desired operating wavelength, and are typically highly dispersive, and may have greater losses than positive materials.

In some examples, metamaterials are used to fabricate the lens designs. The metamaterials need not be negative metamaterials, for example as required by a negative metamaterial lens design. Metamaterials are typically ordered composites having properties arising from electromagnetic response functions that are not observed in the constituent materials and result from the inclusion of artificially fabricated inhomogeneities. Metamaterials operable at radar wavelengths may comprise wires or other conducting structures, in some cases supported by a dielectric substrate material. Metamaterials are described, for example, in WO2006/023195 to Smith et al. Hence, a flat lens may comprise multiple layers of a dielectric material, each layer of dielectric material supporting an electrical conducting pattern such as a metal film resonator.

Index profiles may be approximated by metamaterials having spatially variable properties, for example by spatial variation of unit cell properties. Metamaterials may also be dynamically reconfigurable to e.g. convert between functionalities of a flat lens and other functionality. Index profiles may also be formed in optical materials, such as transparent plastics.

There has been considerable recent interest in metamaterials due to the possibility of negative refractive index. However, negative materials are not required for examples of the present invention, and in some examples positive metamaterials are preferred.

Further, the invention is not limited to any particular wavelength range. Metamaterials can be used for radar wavelengths, as the size constraints on the metamaterial features are not difficult to overcome. However, metamaterials can also be fabricated at IR and optical wavelengths, and these may be used for example flat lenses.

Lenses may also be fabricated using any three-dimensional fabrication technique, such as chemical or physical deposition processes, self-assembled layers, 3D printing, laminating, and the like. Index variations can be introduced through compositional variations and/or dopant concentration variations within a material.

The material used to form the lens can also be referred to as a transformation material, having a spatial index profile that can be designed using transformation optics methods.

The equi-phase surface of a plane wave is a plane. The amplitude of a plane wave is a constant, independent of the position on the equi-phase plane. An aspect of this invention is to transform the original surface of equal amplitude and equal phase of a wave into a planar surface using properly defined coordinate transformations. In some examples of the present invention, the boundaries of the transformed medium are chosen to be planar, corresponding to a flat lens. The lens, which is the transformed medium, has planar interfaces for waves to enter and exit. The entrance plane may be chosen to be the same as the same plane in the original coordinate system before the transformation is applied. A surface in the original coordinate system that has constant phase and amplitude of the incident wave is located. This equi-phase equi-amplitude surface is transformed to the exit plane of the lens. The region between the entrance and exit planes is defined by a continuous conformal coordinate transformation.

However, the shape of the boundary is not limited to planes. In examples, lenses designed using transformation optics may have planar, concave, or convex surfaces. In some examples, planar surfaces are not parallel, for example having a generally wedge or prism-shaped cross-section. A lens face may be configured to be parallel to the phasefront of radiation passing through it, so as to avoid refraction at the lens boundaries.

Theoretical transformation optics approaches which may be used in examples of the present invention are described in the following references: J. B. Pendry, D. Schurig, and D. R. Smith, "Controlling electromagnetic fields," *Science*, vol. 312, pp. 1780-1782, June 2006; D. Schurig, J. B. Pendry, and D. R. Smith, "Calculation of material properties and ray tracing in transformation media," *Opt. Express*, vol. 14, no. 21, pp. 9794-9804, 2006; G. W. Milton, M. Briane, and J. R. Willis, "On cloaking for elasticity and physical equations with a transformation invariant form," *New J. Phys.*, vol. 8, 248, 2006; "Transformation optical designs for wave collimators, flat lenses and right-angle bends", Do-Hoon Kwon and Douglas H Werner, New J. Phys. 10, 115023 (2008), and J. B. Pendry, D. Schurig, D. R. Smith, Controlling Electromagnetic Fields, Sciencexpress, 25 May 2006.

Example 1

As a first example realization, consider a two-dimensional (2D) flat slab that radiates plane waves from its top and bottom interfaces from a line source located at its center. This cylindrical wave-to-planar wave conversion can be achieved by the spatial coordinate transformation described below.

Figure 1B:
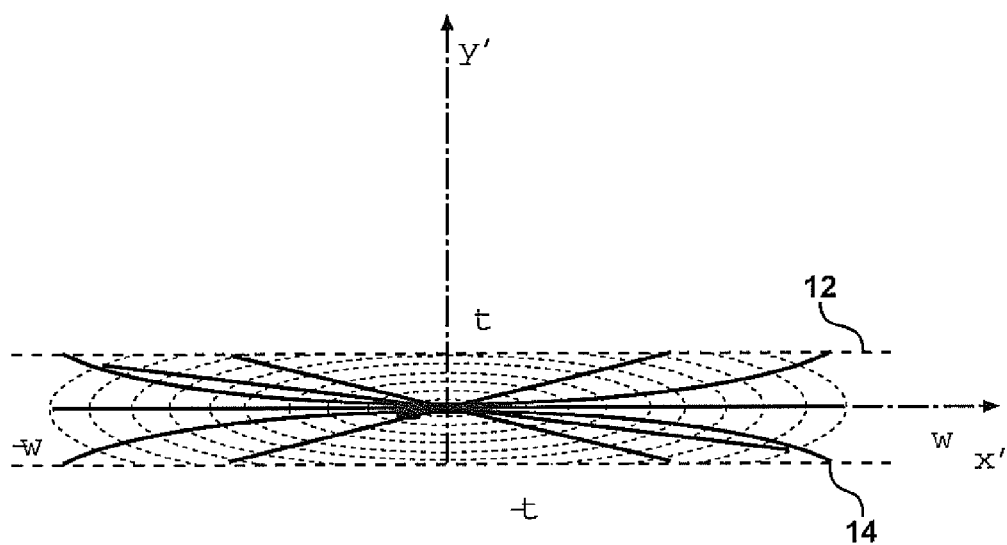
Figure 2A:
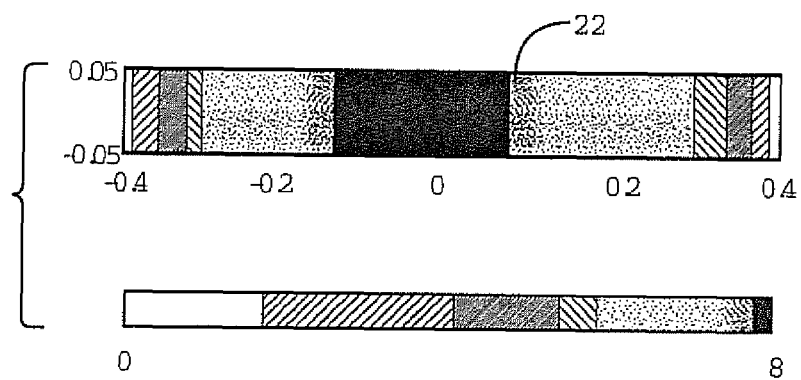
FIGS. 2A-2D show material parameters of an example flat lens design.
Figure 2B:
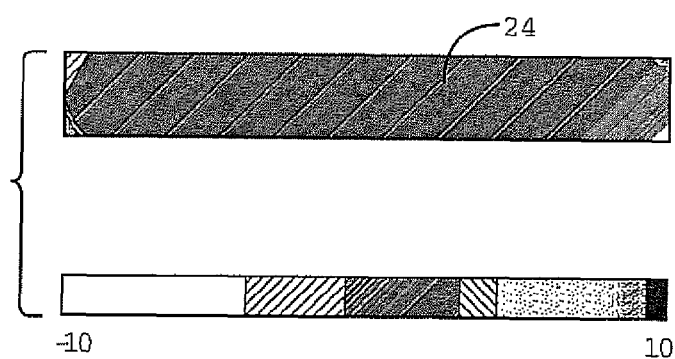
Figure 2C:
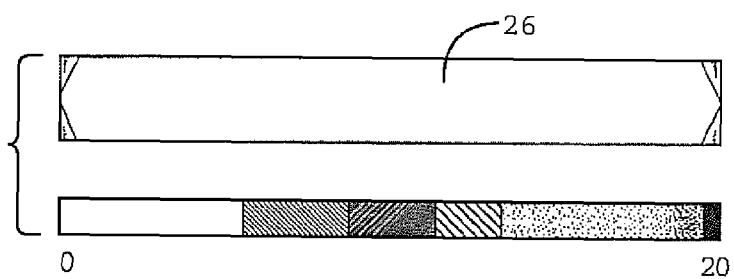
Figure 2D:
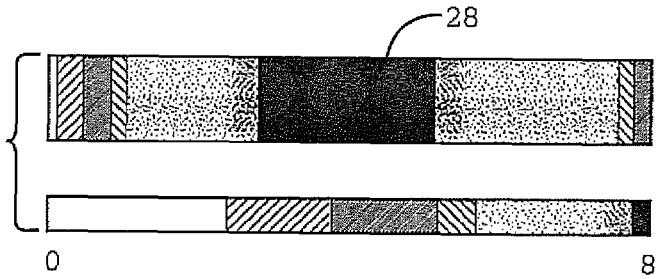

FIG. 1A shows a polar coordinate system where a radiation source (in this example a line source) is assumed to be located at the coordinate origin. The line source radiates cylindrical waves 10. The surface of constant amplitude and constant phase is a circular cylindrical surface of constant radius. The coordinate transformation from the original (x,y,z) system to the transformed (x',y',z') system are defined such that the circular cylindrical volume corresponding to $\rho=\sqrt{x^2+y^2}\leq\alpha$ (FIG. 1A) is transformed to a rectangular cylindrical volume in the transformed system given by $|x'|\leq w$ and $|y'|\leq t$ (FIG. 1B).

One coordinate transformation that achieves this conversion is $$x' = \frac{w}{a}x, \ y' = \frac{t}{\sqrt{a^2-x^2}}y, \ z'=z. \tag{1}$$

One can observe that the circular cylindrical surface $\rho=\alpha$ is mapped into two planar surfaces (12 and 14) at $y'=\pm t$. With the coordinate transformation defined, the material parameters in the transformed coordinate system can be obtained using, for example, a procedure described in Schurig et al., Optics Express 14(21) 9794 (2006). First, a 3×3 matrix A is defined as $$A = \begin{bmatrix} \frac{\partial x'}{\partial x} & \frac{\partial x'}{\partial y} & \frac{\partial x'}{\partial z} \\ \frac{\partial y'}{\partial x} & \frac{\partial y'}{\partial y} & \frac{\partial y'}{\partial z} \\ \frac{\partial z'}{\partial x} & \frac{\partial z'}{\partial y} & \frac{\partial z'}{\partial z} \end{bmatrix}. \tag{2}$$

Then, the permittivity tensor $\overline{\overline{\epsilon}}'$ and the permeability tensor $\overline{\overline{\mu}}'$ are given by $$\overline{\overline{\epsilon}}' = \overline{\overline{\mu}}' = \frac{AA^T}{\det(A)}, \tag{3}$$

assuming that the medium in the original coordinate system is free space. From (1)-(3), the elements of the material parameter tensors are found to be:

$$\varepsilon'_{xx} = \frac{w\sqrt{a^2-x^2}}{at}, \quad \varepsilon'_{yy} = \left[\frac{(txy)^2}{(a^2-x^2)^3} + \frac{t^2}{a^2-x^2}\right]\frac{a\sqrt{a^2-x^2}}{wt}, \quad (4)$$

$$\varepsilon'_{zz} = \frac{a\sqrt{a^2-x^2}}{wt}, \quad \varepsilon'_{xy} = \varepsilon'_{yx} = \frac{xy}{a^2-x^2},$$

and $\in'_{xz}=\in'_{zx}=\in'_{yz}=\in'_{zy}=0$ together with $\bar{\mu}'=\bar{\varepsilon}'$.

FIGS. 2A-2D show material parameters of a wave collimator design, showing the spatial variation of $\in'_{xx}$, (22), $\in'_{xy}$, (24), $\in'_{yy}$, (26), and $\in'_{zz}$ (28) respectively. In this example, the geometry of the collimator design is a rectangular structure having dimensions t=0.05 m, and w=0.4 m.

Figure 3A:
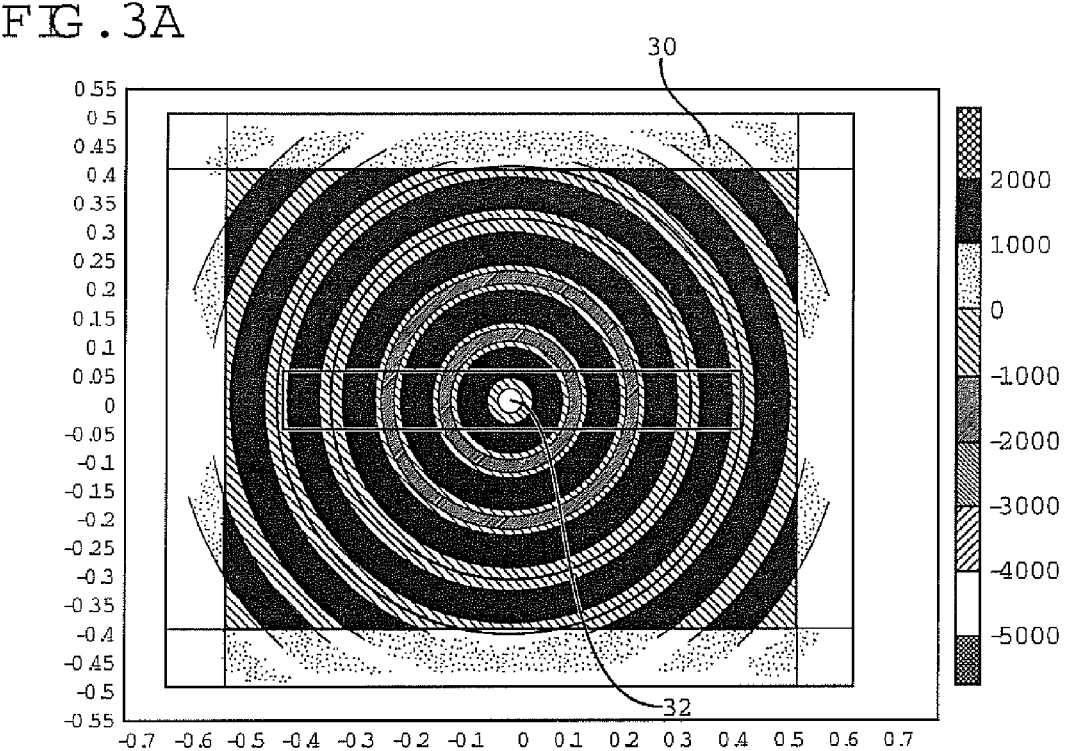
FIGS. 3A and 3B show snapshots of the total electric fields radiated by a line source at the coordinate origin, where
Figure 3B:
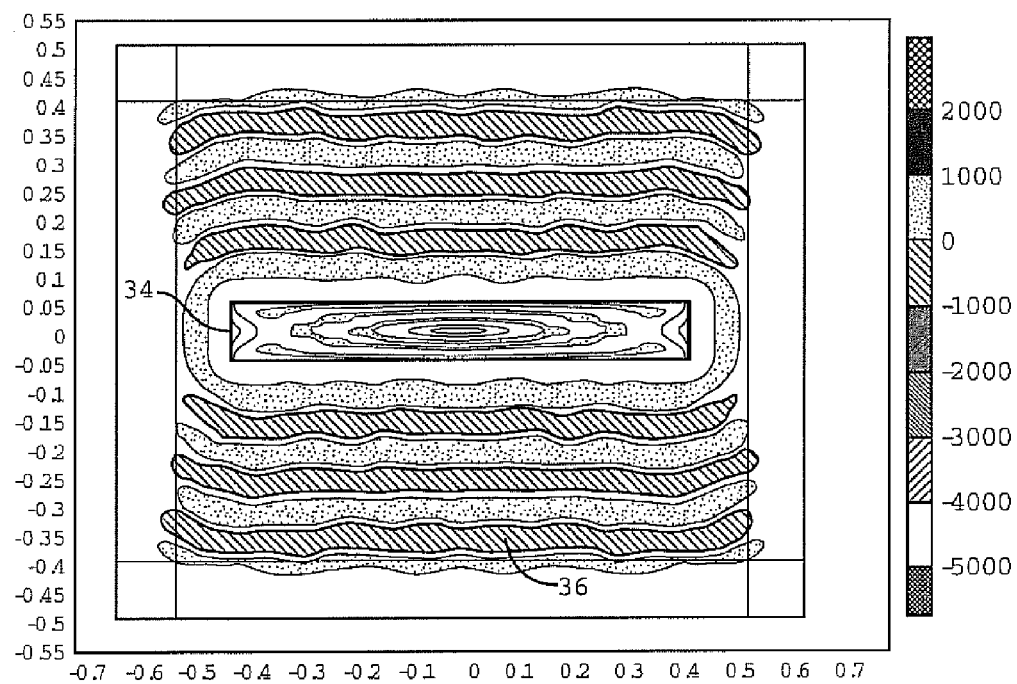

FIGS. 3A-B illustrate the performance of an example realization of a transformation medium in the form of a flat lens, where snapshots of z-directed total electric field in the x-y plane are shown for a line source. FIG. 3A shows the line source 32 radiating in free space, radiates a cylindrical wave 30. FIG. 3B shows the line source embedded in a flat lens 34 with the material parameters specified by Equation 4. Waves having planar wavefronts (such as wavefront 36) propagate in the ±y directions emerge from the top and the bottom surfaces of the slab-shaped flat lens 34.

In this simulation, the phasefront contours of the waves emerging from the collimator (e.g. shown at 36) are generally planar, but close observation reveals the presence of very small ripples in the otherwise planar wavefront. These ripples may result from diffraction from the edges of the slab at x'=±w, or from an imperfect impedance match at the boundary between the collimator lens and free space. Modified transformations may be used to reduce such minor phasefront irregularities, if important.

In this example, the time-harmonic frequency of operation of the line source is 3 GHz. The geometrical parameters of the coordinate transformation (shown in FIGS. 1A and 1B) are a=0.1 m, w=0.4 m, and t=0.05 m. The single-frequency radiation problem is rigorously solved using the commercial full-wave numerical analysis package COMSOL Multiphysics (Comsol Inc., Burlington, Mass.), which is based on the finite-element method. Examples described herein are two-dimensional (2D), however, the transformation optics design approach can be readily extended to develop 3D versions of these devices.

Example 2

The previous example included a source embedded inside a transformation medium that converts a cylindrical wave to a planar wave. A different cylindrical wave-to-planar wave converter can be designed for cases where a cylindrical wave source is located outside a transformation medium device.

Figure 4A:
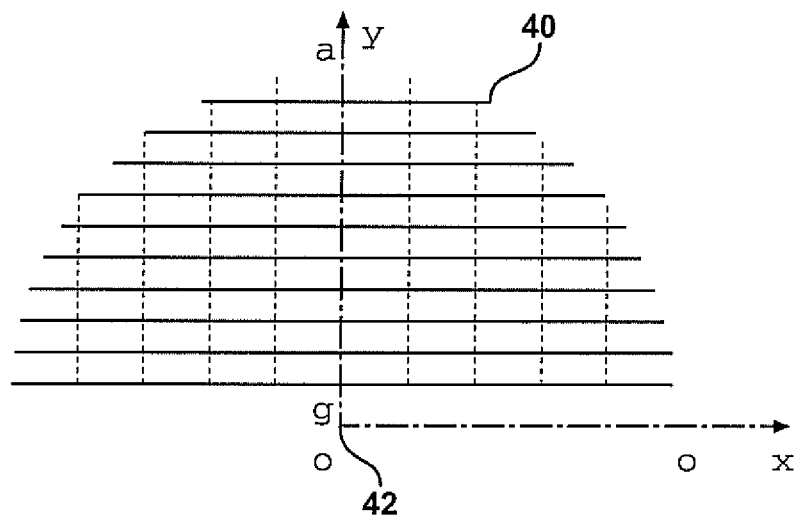
FIGS. 4A and 4B show coordinate systems for a cylindrical-to-planar wave converter for cases where a source is located outside a transformation medium, where
Figure 4B:
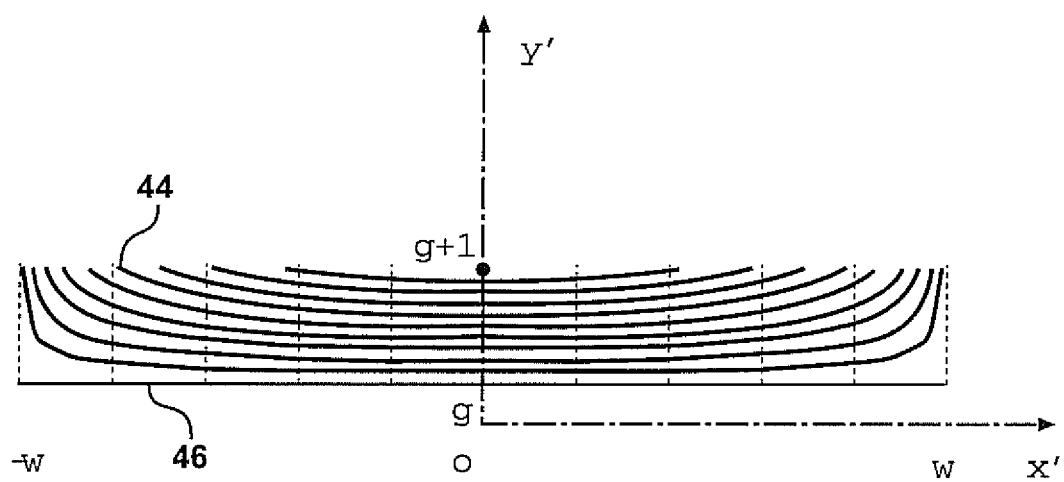

FIGS. 4A and 4B shows the original and transformed coordinate systems, respectively, associated with a planar slab lens design. A line source, such as that described in the first example, is located at the coordinate origin 42 and radiates a cylindrical wave. The surface of constant amplitude and constant phase is a circular cylindrical surface of constant radius. Therefore, if a region bounded by a planar interface at the source side given by y=g and the arc given by ρ=α (40) is transformed into a slab region (46) bounded by y'=g and y'=g+1 such that the arc centered at the origin is mapped to the planar interface y'=g+1 (44) in the transformed system, a planar wave will emerge and propagate in the +y direction in the transformed space.

The expression x=x'=±w (w=$\sqrt{\alpha^2-g^2}$) defines the boundaries in the x axis direction for both the original and the transformed systems.

An appropriate transformation can be defined as $$x' = x, \quad y' = \frac{l}{\sqrt{a^2-x^2}-g}(y-g)+g, \quad z' = z. \quad (5)$$

From (2), (3), and (5), the material tensor parameters of the flat lens are found to be $$\varepsilon_{xx} = \frac{\sqrt{a^2-x^2}-g}{l}, \quad \varepsilon_{xy} = \varepsilon_{yx} = \frac{x(y-g)}{\sqrt{a^2-x^2}\left(\sqrt{a^2-x^2}-g\right)}, \quad (6)$$

$$\varepsilon_{yy} = l\left(\sqrt{a^2-x^2}-g\right)\left\{\frac{[x(y-g)]^2}{(a^2-x^2)\left(\sqrt{a^2-x^2}-g\right)^4} + \frac{1}{\left(\sqrt{a^2-x^2}-g\right)^2}\right\},$$

$$\varepsilon_{zz} = \frac{\sqrt{a^2-x^2}-g}{l},$$

and $\varepsilon'_{xz} = \varepsilon'_{zx} = \varepsilon'_{yz} = \varepsilon'_{zy} = 0$.

Figure 5A:
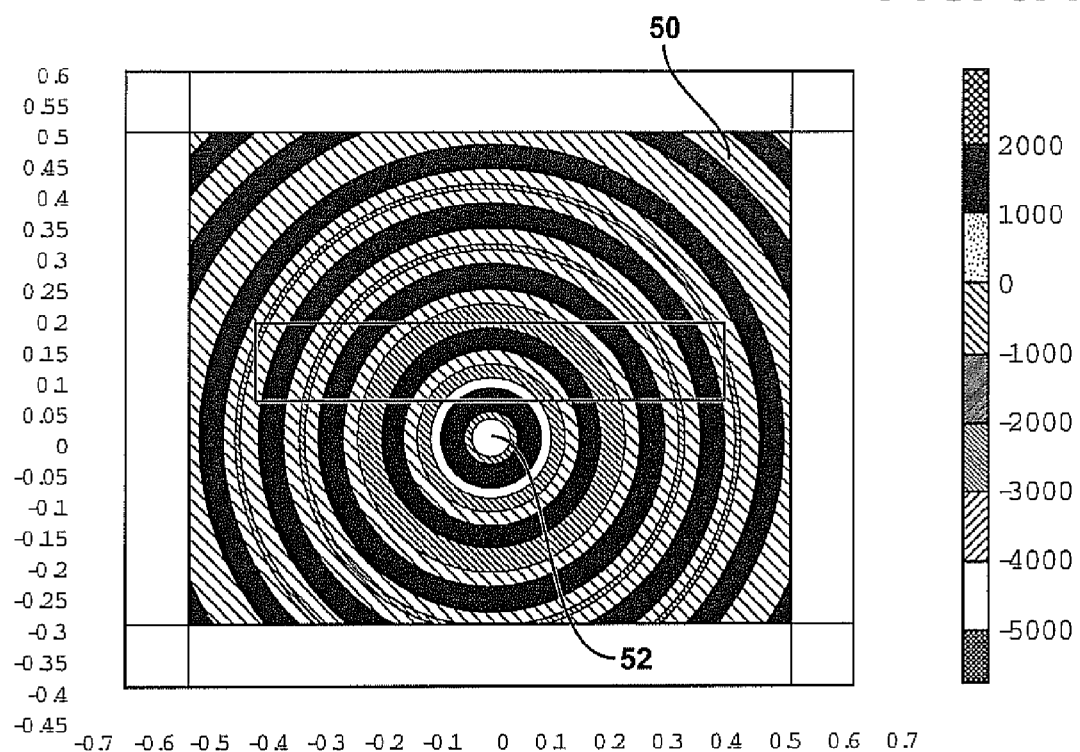
FIGS. 5A and 5B illustrate snapshots of the total z-directed electric field on the x-y plane, where
Figure 5B:
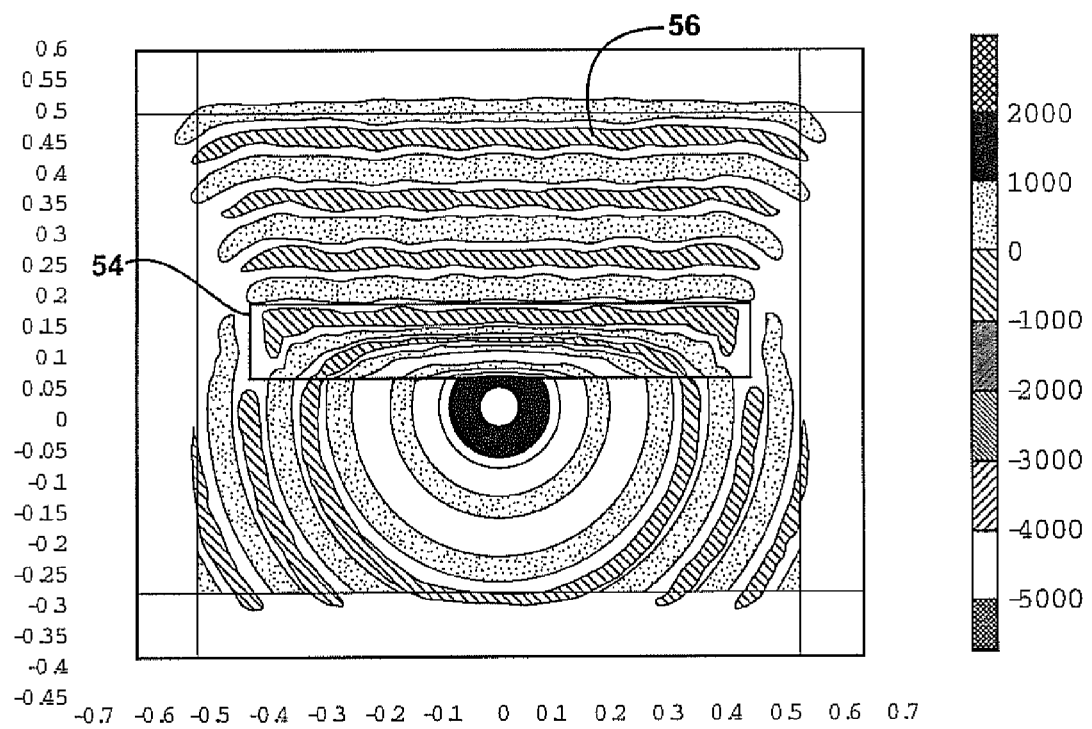

FIGS. 5A and 5B illustrate an example realization and performance of a flat lens according to Equations (5)-(6). In FIG. 5A, a line source 52 operating at 3 GHz radiates cylindrical waves 50 from the coordinate origin. The figure shows a rectangular outline where a lens is then placed.

FIG. 5B shows a flat lens (transformation medium slab) 54 placed in front of the line source. The parameters of the flat lens are given by w=0.4 m, g=0.05 m, l=0.1 m. FIG. 5B shows that the portion of the cylindrical wave that is captured by the lower interface of the lens (y=g, |x|≤w) is converted into a plane wave 56 upon exit from the upper interface (y=g+l, |x|≤w), and propagates in the +y direction. Wave components diffracted from the edges of the finite lens contribute to small ripples in the phase front. However, the cylindrical wave-to-planar wave conversion by the flat slab lens is demonstrated. The figures show z-directed electric field strength over the x-y plane in arbitrary units, where y is the vertical direction as illustrated.

Example 3

The previous example realizations of the invention demonstrated conversions from cylindrical waves to planar waves. In many applications, focusing of a radiation source to form an image in the near zone is desirable.

Near-field focusing can be easily obtained by using two far-field focusing flat lenses in a back-to-back configuration. The transformation medium is a reciprocal medium. Therefore, a cylindrical-to-planar wave converter operates as a planar-to-cylindrical wave converter when a plane wave is incident on the far-field focusing lens at a light angle. If two far-field focusing flat lenses are arranged in a back-to-back fashion and a cylindrical wave source is located at the focal point of the first lens, the first lens converts the cylindrical wave into a plane wave and the second lens transforms the plane wave into a converging cylindrical wave to form an image. Effectively, two far-field focusing lenses form one near-field focusing flat lens. A single element may also be designed to achieve this function.

Figure 6A:
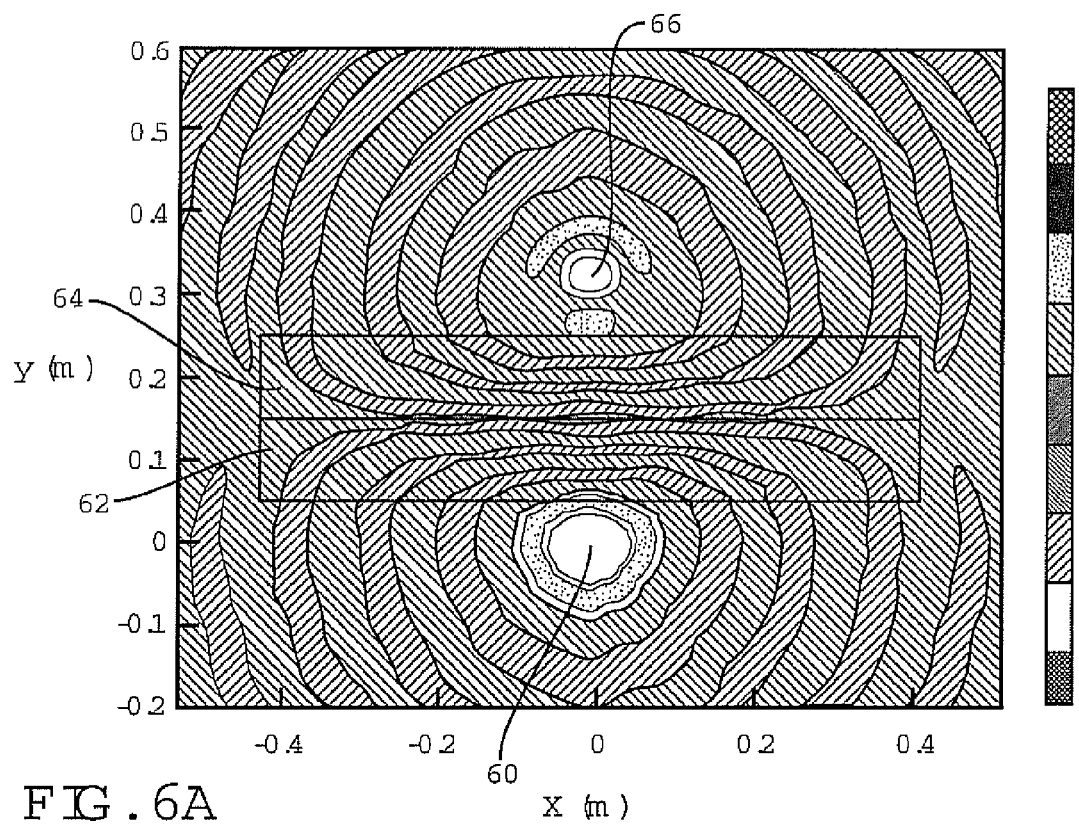
FIGS. 6A and 6B each show a near-field focusing flat lens assembly comprising two far-field focusing flat lenses connected in a back-to-back configuration, the lens assembly forming an image of the original electric line source positioned on the opposite side of the lens.
Figure 6B:
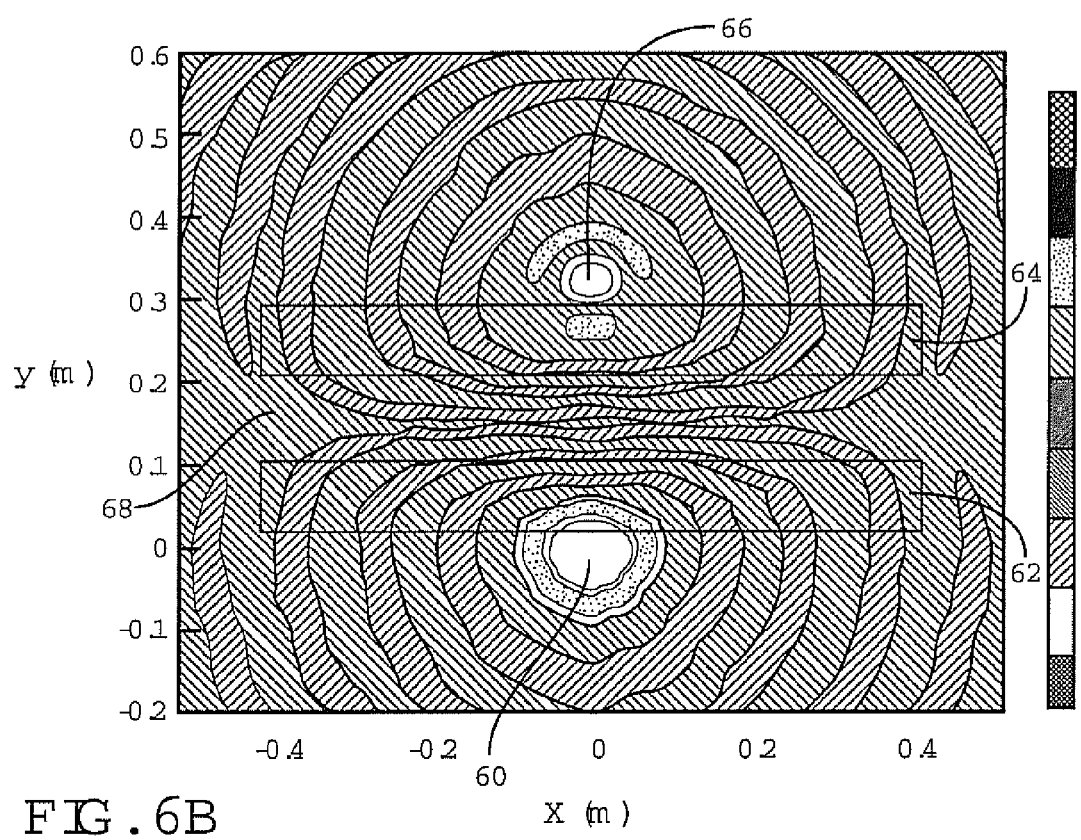

FIGS. 6A and 6B demonstrate approaches to a near-zone focusing flat lens. FIG. 6A shows a line source 60 radiates at the coordinate origin at 3 GHz, which is positioned at the distance of g=0.05 m from the bottom interface of the first far-field focusing lens 62. The geometrical and the material properties of the first lens may be similar to the one shown in FIG. 5B. In this example, the second lens 64 is adjacent to the first lens, without a gap between the lenses. The second lens is the same as the first lens except that it is rotated 180° with respect to the z-axis. The first lens transforms the diverging cylindrical wave into a plane wave at its top planar interface. The figures show electric field strength in arbitrary units (from −1 to +1) corresponding to the vertical scale bar at the right of the figures. This convention is also used for other figures showing field strength.

The phase-fronts of the waves inside the lenses smoothly change from diverging cylindrical waves, through planar phase-fronts, to converging cylindrical waves to form an image at the focus 66 in the near zone directly above the lens (as illustrated). The second lens accepts the plane wave, without appreciable reflection, and converts it into a converging cylindrical wave to form an image at the designed distance of 0.05 m from the output face of the second lens. Near-field focusing is clearly demonstrated.

Since the phase-front is planar once the cylindrical waves radiated by the line source pass through the first far-zone focusing lens, the distance between the two far-zone focusing lenses 62 and 64 that comprise the near-zone focusing lens assembly can be arbitrary. The two far-field focusing lenses do not need to share a common planar interface. For example, the two flat lenses can be separated in the y direction. The plane wave emerging from the exit plane of the first lens will simply travel in the +y direction before being converted into a converging cylindrical wave by the second lens to form an image.

FIG. 6B shows the two lenses 62 and 64 with 0.1 m separation between them, a separation of one wavelength. The electric line source 60 located at the coordinate origin radiates at 3 GHz. A planar phase-front can be seen in the region 68 between the two far-zone focusing lenses. The image qualities for the two different lens configurations considered in FIGS. 6A and 6B are approximately equal.

Hence, the design of flat far-field focusing and near-field focusing lenses has been derived and demonstrated in 2D configurations that are assumed infinite in the ±z directions. The 2D demonstrations are purely based on the convenience of having manageable computational problems. However, examples of the present invention also include three-dimensional (3D) designs of far-field focusing and near-field focusing lenses based on the design principles presented herein.

Example 4

In the RF frequency range, examples of the present invention include applications in antennas where highly directive radiation characteristics are desired.

Figure 7A:
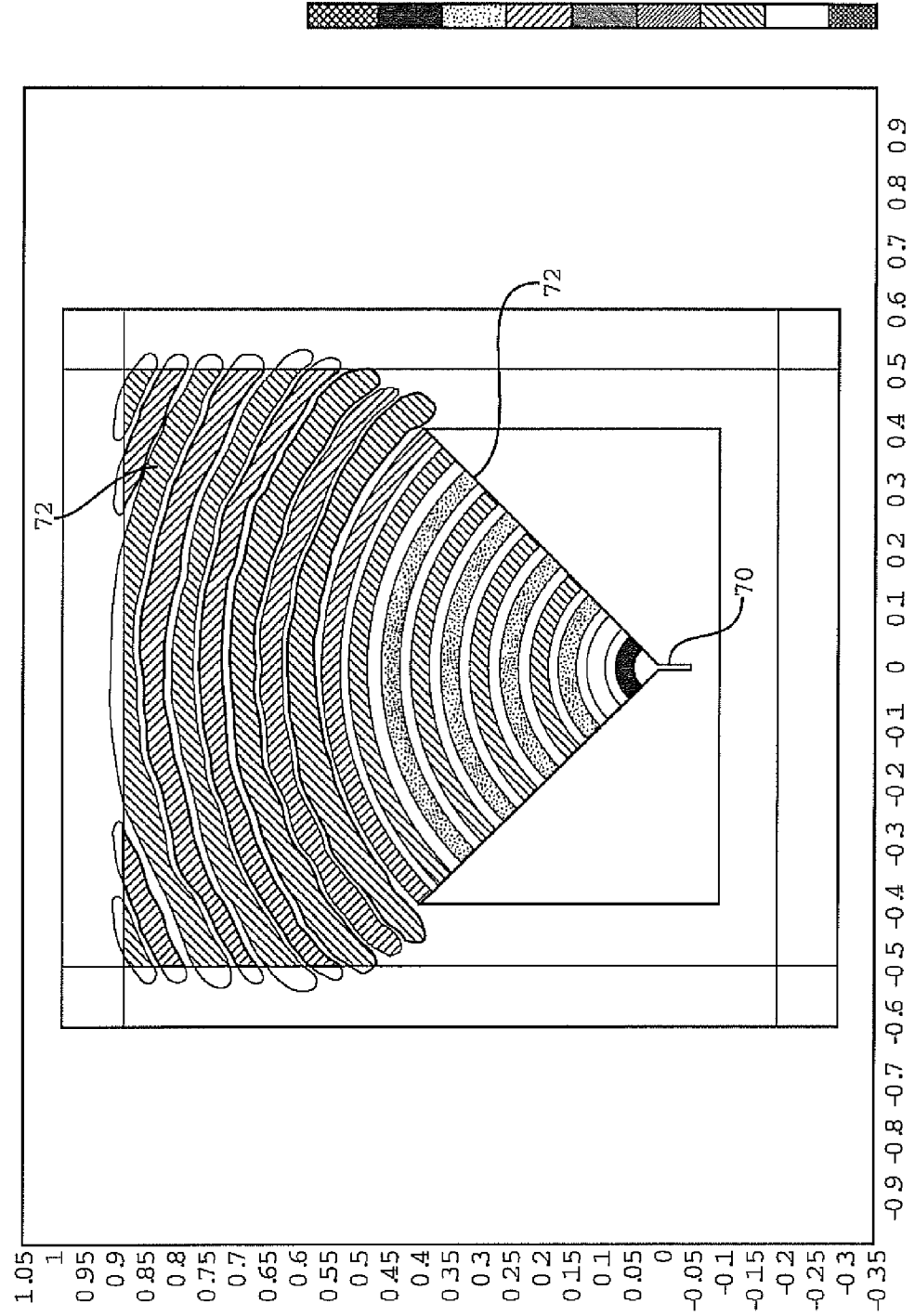
FIGS. 7A and 7B show the z-directed total magnetic field associated with the radiation by a 2D horn antenna without the lens and capped with the far-field lens, respectively.
Figure 7B:
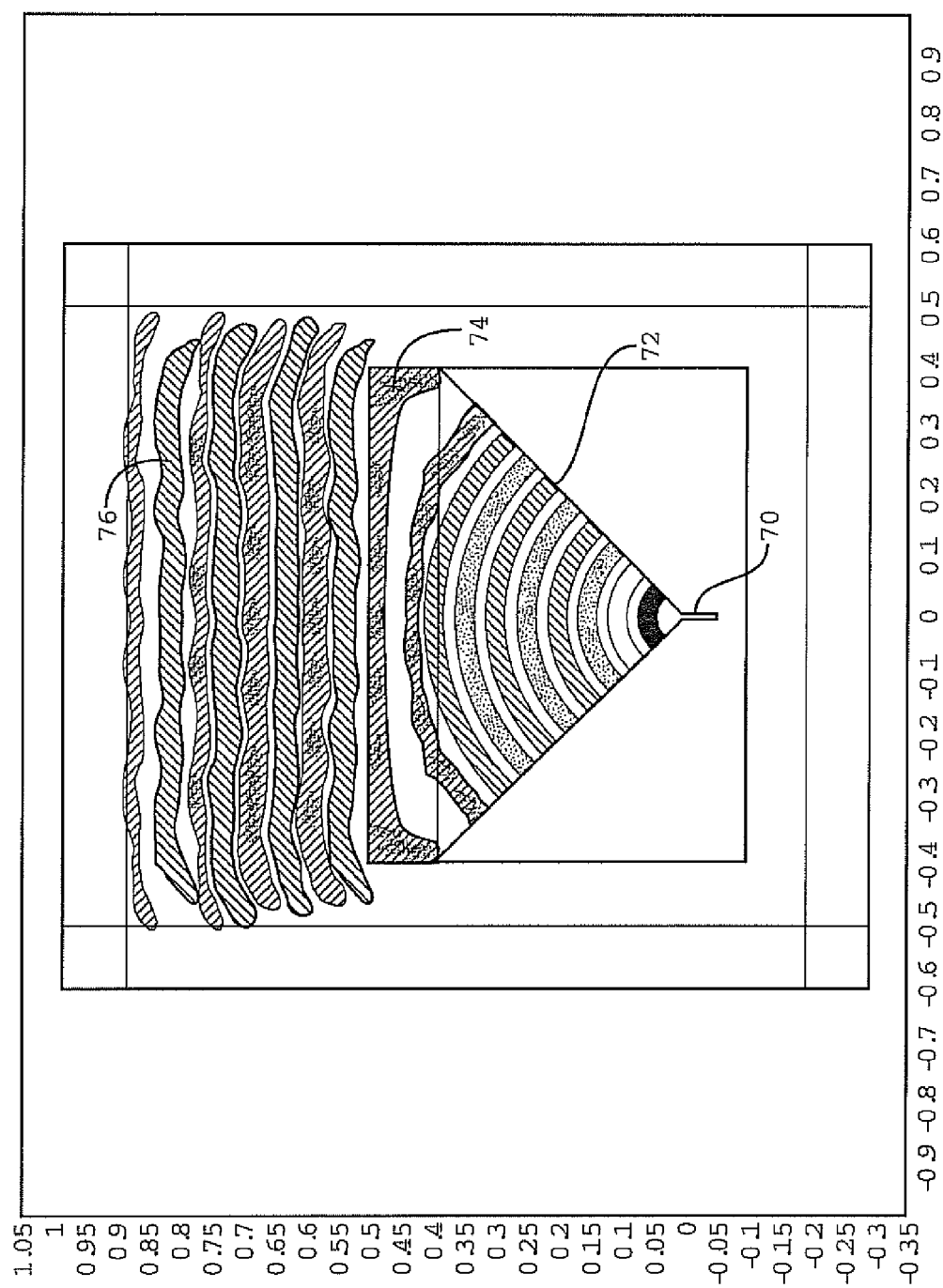

FIGS. 7A-B show a 2D horn antenna used for illustrative purposes. The same design and operation principles described above may be readily applied to 3D flat lenses and horn antennas.

FIG. 7A shows the z-directed total magnetic field distribution due to a horn antenna 72 having perfect electric conducting walls excited by a parallel-plate waveguide 70. Cylindrical waves are observed inside and outside the horn aperture. The figures show z-directed magnetic field strength over the x-y plane in arbitrary units, corresponding to the scale bar on the right of the figures.

FIG. 7B shows the 2D horn antenna capped with a far-field focusing flat lens 74. The lens converts cylindrical waves from the antenna into planar waves, allowing the antenna radiate a highly directive beam in the +y direction (directly upward as illustrated). In antenna engineering terms, the antenna capped with the lens in FIG. 7B has a higher directivity than the horn antenna in FIG. 7A.

Example 5

A beam redirection device was designed that rotates the direction of propagation of an incident beam field by a redirection angle, such as 90°. The appropriate transformation maps a square cylindrical region into a fan-shaped cylindrical region such that an electromagnetic beam propagating alone a straight-line path in the original space is smoothly bent into a circular arc in the transformed space.

Figure 8A:
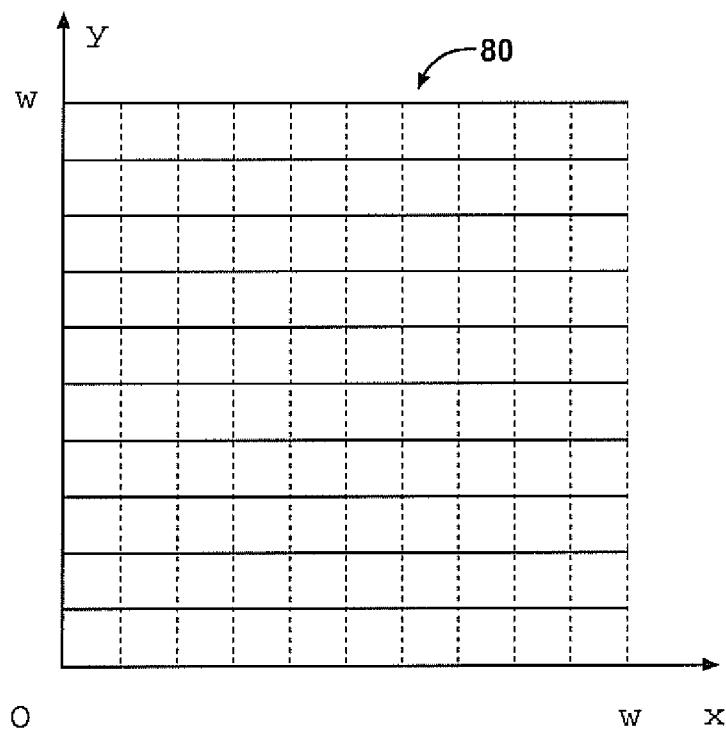
FIGS. 8A-8B show the coordinate transformation for a right-angle bend device.
Figure 8B:
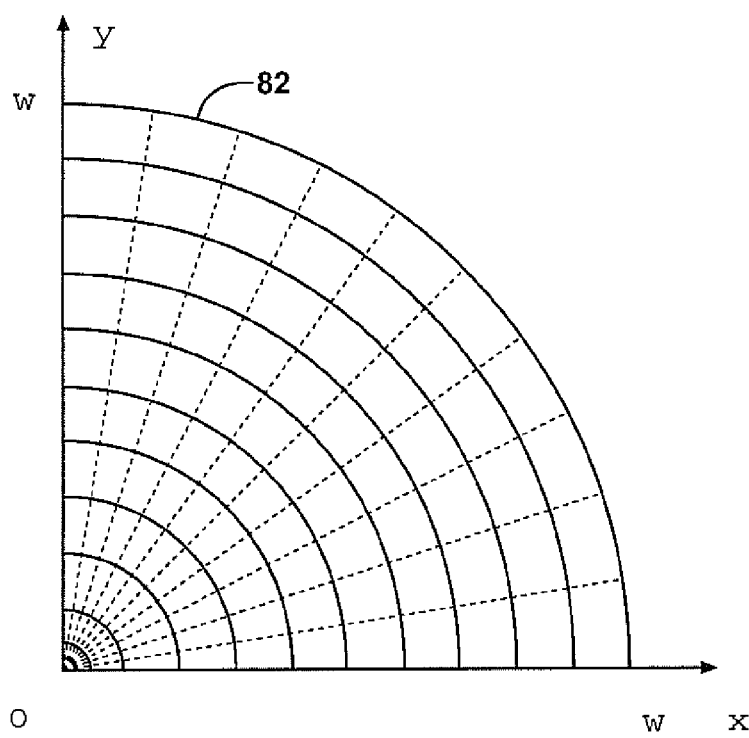

FIGS. 8A-B show the coordinate transformation. The embedded transformation approach was applied to a square cylindrical volume to rotate the direction of beam propagation by 90°.

FIG. 8A shows a 2D cylinder 80 with a square cross section of size w×w. This is transformed into a cylinder 82 with a fan-shaped cross section, as shown in FIG. 8B. Consequently, as a narrow beam propagates in the +x̂-direction in the original system, the same beam entering the device in the transformed system will undergo a rotation through 90° and emerge propagating in the −ŷ'-direction.

The appropriate coordinate transformation may be written as $$\rho' = y, \qquad (7)$$
$$\phi' = \frac{\pi}{2w}(w - x),$$
$$z' = z,$$

where $\rho' + \sqrt{x'^2 + y'^2}$ and $\phi' = \tan^{-1}(y'/x')$. The Cartesian coordinates in the transformed systems can be retrieved from $x' = \rho' \cos \phi'$ and $y' = \rho' \sin \phi'$. Under this transformation, constant-x lines are mapped into constant-$\phi'$ radial lines, and constant-y lines are mapped into constant-$\rho'$ curves. The corresponding material parameters in the primed system are found from $$\epsilon'_{xx} = \frac{\pi \rho'}{2w} \sin^2 \phi' + \frac{2w}{\pi \rho'} \cos^2 \phi', \qquad (8)$$

$$\epsilon'_{xy} = \epsilon'_{yx} = \sin \phi' \cos \phi' \left( \frac{2w}{\pi \rho'} - \frac{\pi \rho'}{2w} \right), \qquad (9)$$

$$\epsilon'_{yy} = \frac{\pi \rho'}{2w} \cos^2 \phi' + \frac{2w}{\pi \rho'} \sin^2 \phi', \qquad (10)$$

$$\epsilon'_{zz} = \frac{2w}{\pi \rho'}. \qquad (11)$$

An example right-angle bend design had w=0.3 m. All material parameters approach infinity at the origin because the line segment corresponding to 0≤x≤w and y=0 is mapped to a single point in the transformed system. The minimum values of $\epsilon'_{xx}$ and $\epsilon'_{yy}$ are zero at the origin (the corner of the right-angle bend) when approached from the directions $\phi'=\pi/2$ and 0, respectively. The minimum value of $\epsilon'$ yy is equal to $(2/\pi - \pi/2)/2$ realized at $\rho'=w$ and $\phi'=\pi/4$. $\epsilon'$ zz is a function of $\rho'$ only and its minimum value is equal to $2/\pi$ at $\rho'=w$.

To test the performance of the right-angle bend design, a Gaussian beam is employed as the incident field. A $\hat{z}$-directed 2D Gaussian beam incident field $E^i=\hat{z}E^i_z(x', y')$ may be expressed as:

$$E^i_z(x', y') = \frac{W_0}{W(x')}e^{-\left[\frac{|y'-y_r|}{W(x')}\right]^2} e^{-j\left[k(x'-x_r)-\frac{k|y'-y_r|^2}{2R(x')}-\tan^{-1}\frac{x'-x_r}{x_0}\right]} \quad (12)$$

where $k=2\pi/\lambda$ is the free-space wavenumber, and an exp (j$\omega$t) time convention is assumed and suppressed. The radius of curvature R(x') and the spot size W(x') are given by $$R(x') = (x'-x_r)\left[1+\left(\frac{x_0}{x'-x_r}\right)^2\right], \quad (13)$$

$$W(x') = W_0\sqrt{1+\left(\frac{x'-x_r}{x_0}\right)^2}. \quad (14)$$

The parameter $x_0$ is defined as $x_0=kW_0^2/2$, where $W_0$ denotes the minimum waist of the beam. In addition, $(x_r, y_r)$ represents a reference point for the beam expression.

Figure 9A:
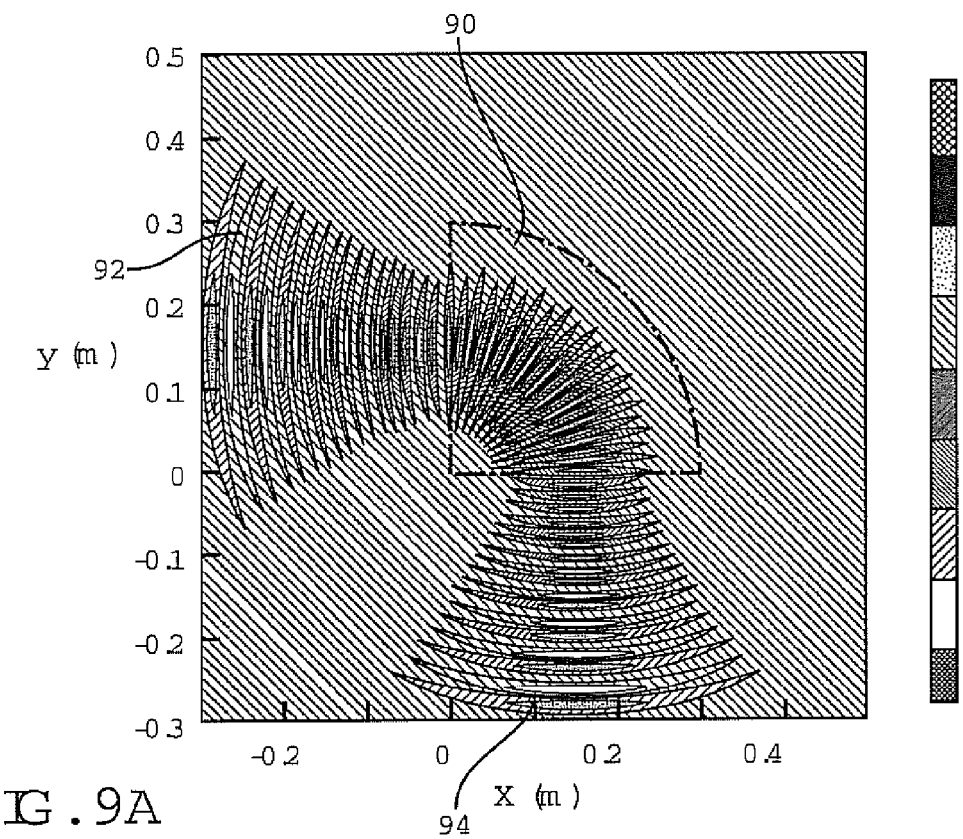
FIGS. 9A-B show a 3 GHz Gaussian beam propagating in the +$\hat{x}$'-direction incident on the right-angle bend.
Figure 9B:
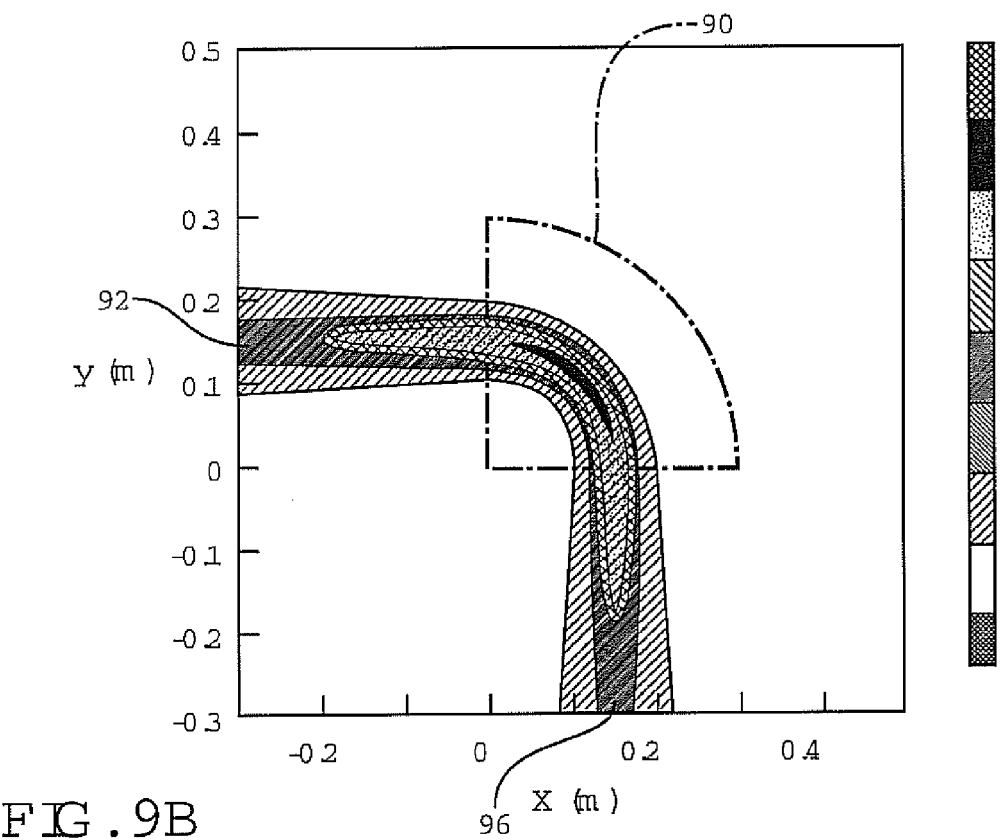

FIGS. 9A and 9B show a 3 GHz Gaussian beam 92 propagating in the +$\hat{x}$'-direction is incident on the input face of the right-angle bend 90. The dimension of the device is given by w=0.3 m, and the minimum waist is assumed to be $W_0$=0.05 m. Finally, the reference point for the beam is taken to be $(x_r, y_r)$=(0.15 m, 0.15 m). In the COMSOL simulation, an impressed magnetic surface current was placed on the surface x'=−0.3 m in order to radiate the Gaussian beam into the simulation domain.

FIG. 9A shows that the propagation direction of the incident Gaussian beam 90 is rotated by 90° in the −$\hat{\phi}$'-direction to become the output beam (94). There is no reflection at both the entry plane along x'=0 and at the exit plane along y'=0. The figure shows electric field strength in arbitrary units corresponding to the scale bar on the right of the figure.

FIG. 9B shows the normalized power flow (0 to 1, corresponding to the scale bar on the right) within the simulation domain. The power density changes along the propagation trajectory (input beam 92, curved beam within the redirection device 90), and output beam 96) due to the variable nature of the beam waist. Virtually all the incident power is redirected into the −$\hat{y}$'-direction.

Advantages of Flat Lenses

Due to mismatch in wave impedance in free space and the lens material, some reflections of wave at the interface of conventional lenses are unavoidable. Techniques are available to reduce reflections, such antireflection coatings, but they tend be limited to narrow bandwidths. In addition, since manipulation of wave propagation is achieved by the exact curved geometrical properties of lenses, application and integration of conventional lenses in optical and RF devices usually require other supplemental elements and become complex.

Hence, flat lenses according to examples of the present invention allow improved matching, reduced losses due to reflection, and higher power transmission.

Flat lenses are more practical than conventional curved lenses. Using fabrication technologies for anisotropic materials, flat lenses according to the present invention may replace curved lenses. Flat lenses utilizing negative-index materials are too lossy for most practical lensing applications, whereas examples of the present invention do not employ such negative materials. Flat lenses can be used as effective collimators for an embedded source such as a radio frequency antenna or an optical source, allowing compact radiation sources with improved directionality. Flat lenses can further be used to achieve near-field or far-field focusing for a radio frequency antenna or an optical source located in the near field of the lens.

In some examples, additional coatings may be provided. These may include anti-reflection coatings, scratch-resistant coatings, filters (e.g. UV filters) and the like.

Application of coatings to a flat surface is typically easier than applying coatings to a curved surface. For example, an improved spectacle lens may be a flat lens having antireflection coatings and/or anti-scratch coatings on the front and back flat surfaces.

Coordinate Transform Methods

The index profile of the lens can be calculated using a spatial coordinate transformation method, for example as described in J. B. Pendry, D. Schurig, and D. R. Smith, "Controlling electromagnetic fields," Science, vol. 312, pp. 1780-1782, June 2006. For example, in the case of a plane wave entering one surface of the lens and exiting the other surface of the lens is a converging beam, the index profile of the material between the entrance and exit planes can be calculated using a continuous conformal coordinate transformation. The behavior of a general entrance beam and that of a general exit beam can be represented by a coordinate transformation, and this coordinate transformation can be used to determine the index profile required to achieve the desired conversion in beam properties.

In a coordinate transform approach, the transformation of the entrance beam to the exit beam is represented by a coordinate transformation mapped from the entrance plane to an exit plane. However, it is not necessary that the lens has planar entrance and/or exit planes, nor that the entrance and exit planes if present are parallel. For example, a transformation lens may have a prism shape (such as a wedge shape), so that the first plane and the second plane are not parallel. In such a case, the coordinate transformation transforms the entrance waveform to an exit waveform on a plane oriented in the desired orientation. Material properties are then spatially varied so as to obtain the desired bending of electromagnetic waves within the transformation medium. The transformation medium (the lens material, in the case of a lens) is typically an inhomogeneous and anisotropic medium.

In some examples, the lens material may be referred to as a transformation medium, the lens material having an index profile (variation in electromagnetic properties as a function of position) that induces a change in electromagnetic radiation passing through the lens that corresponds to a coordinate transformation, such as a transformation from cylindrical or spherical geometries to planar geometries, or vice versa. A lens may be referred to as a transformation lens.

Hence, in examples of the present invention, the transformation of a first beam to a second beam, the first beam representing the entrance beam and the second beam being the exit beam, is represented mathematically by a coordinate transformation. The coordinate transformation is then used to calculate the required index profile needed to transform the entrance beam to the exit beam, for example for a flat lens profile. The resulting index profile can be fabricated using various techniques.

Positive Versus Negative Materials

Flat lenses achieved using a negative refractive index medium have been described. A flat slab with negative values for the effective electric permittivity and magnetic permeability was shown to work as a perfect flat lens, in J. B. Pendry, "Negative refraction makes a perfect lens," *Phys. Rev. Lett.*, vol. 85, no. 18, pp. 3966-3969, 2000.

The requirement of a negative refractive index for such lenses presents various manufacturing problems. Negative index materials (e.g. having negative values of permittivity at the operating wavelength) are difficult to design. Materials having negative refractive index, even if available, generally are lossy (energy loss within the material) in their negative-index bands, and dispersive (wavelength dependent properties limit their use). Typically, the loss is so severe to the degree that perfect image reconstruction of a flat lens fails to provide the sub-wavelength resolution and becomes impractical. Negative lenses may have severely limited bandwidth and dispersion problems. Negative index materials are not readily available for optical wavelengths.

Hence, there are considerable advantages to using positive materials, e.g. having positive values of permittivity at the operating wavelengths, which include most conventional optical materials such as glass, plastic, and the like, and metamaterials configured to be positive media.

Lenses according to examples of the present invention can be fabricated using positive materials, e.g. a lens material having a positive refractive index. The lens material may be a solid, or a composite having a solid component (such as a metamaterial). Flat lenses have previously been suggested using negative materials, however negative materials are typically highly lossy.

Examples include flat lenses formed of positive materials, including positive index metamaterials (metamaterials having a positive index at wavelengths of operation). However, examples lenses according to the present invention also include lenses formed from negative materials according to approaches described herein, and may include as lenses including both positive and negative index regions within the same lens.

Wavelengths of Operation

Examples of the present invention include flat lenses having diverging or converging properties over an operating electromagnetic range. The operating electromagnetic range may be radio waves, THz radiation, IR, visible, or UV, or a combination thereof.

Embodiments of the present invention are not restricted to a particular electromagnetic range. For example transformation lenses can be achieved in radar wavelengths, IR wavelengths, visible wavelengths, and UV wavelengths. These examples are illustrative and not restrictive on the invention. The coordinate transformation technique can be used to determine index profiles for any desired electromagnetic operating range. However, the material used to form the transformation lens may be chosen based on its general properties within the desired operating wavelength range.

Applications

The present invention can be used in optical applications where conventional curved lenses are used for far-field and near-field focusing purposes. Examples include optical elements acting as converging or diverging lenses within optical wavelengths, such as visible light.

In the RF frequency range, examples of the present invention include improved antennas, for example where highly directive radiation characteristics are desired. Antennas may transmit, receive, or transceive radiation with improved directional properties.

A flat lens according to an example of the present invention can replace conventional curved lenses in any application where the conventional lens is used. Due to the preferable shape of the flat lens, avoiding the problems of curved surfaces, flat lens may replace conventional curved lens in any or all applications where conventional curved lens are previously used. Examples include optical instruments such as imaging devices (such as spectacles, binoculars, telescopes, and cameras), projection devices, lithographic devices, fiber couplers, other fiber optical systems, and the like. Examples include radiation focusing devices within consumer electronics such as DVD players. Examples include laser apparatus such as laser welding devices, other industrial laser equipment, medical laser equipment, laser fusion devices, and the like. Reduced reflection from planar interfaces are advantageous for high power laser applications, for example CW lasers devices (in particular where the laser power is greater than 1 W), or pulsed lasers.

In some examples the transformation optics such as lenses of the present invention can be included in the housing of a radiation source, such as a light bulb, light emitting diode, laser (such as a diode laser or solid state laser), and the like, In some examples, a lens may be integrated with a radar antenna to provide an improved radiation source (e.g. a frequency or frequency range within the range 1 GHz-100 GHz) having improved directional qualities.

In some examples, the focusing functionality of a flat lens can be combined with the other optical functions, such as wavelength filtering, spatial filtering, dispersive elements, diffractive elements, beam steering, amplitude and/or phase modulation, and the like, so as to achieve desired effect(s).

In some examples, flat lenses can be configured for use with ultrasound, for example comprising a three-dimensional array of mechanical resonators having spatially varying properties. A metamaterial can be used, for example a metamaterial configured for use with ultrasound. Examples include improved ultrasound imagers for medical, security, mechanical evaluation (e.g. non-destructive testing), and other applications. In ultrasound examples, the metamaterial (or other lens material) may exhibit a positive index at the wavelength of the ultrasound. Example lenses can also be configured for use with ionizing radiation, for example for improved x-ray imagers. For example, arrays of metal capillary tubes may be layered to obtain desired wavefront modifications.

In some examples, a lens may be configured so that entry and/or exit electromagnetic waves are generally normal to the lens surface. Such a lens may be, for example, plano-concave or piano-convex. For example, a planar beam may enter the flat surface of a plano-convex lens, and a diverging beam leave the convex surface (or a converging beam leave the concave surface) even with a positive index material and no appreciable refraction at the lens surfaces. In some example lenses, refraction of the electromagnetic beam is mostly achieved using the internal index profiles, and refraction at the surface is of less importance, and may be relatively insignificant compared with refractive effects within the lens material. In some examples, refraction within the material may be combined with refraction at one or more surfaces to obtain e.g. high power lenses.

Fabrication of Lenses

For microwaves, millimeter waves, and radar wavelengths, metamaterials can be used for beam control. In some examples of the present invention, a flat lens may comprise a metamaterial having arrays of conductive elements supported on one or more dielectric substrates. For example, a metamaterial may comprise a plurality of parallel dielectric substrates, each dielectric substrate supporting an array of conductive members, the conductive members typically being resonators, for example formed as ring structures on a printed circuit board or other sheet-like dielectric substrate. In metamaterials, the size scale of the conductive elements is typically less than the operating electromagnetic wavelength.

For example the electromagnetic wavelength may be approximately three times greater, or more typically five times greater, than the unit cell representing the array of conducting elements.

The fabrication flexibility of metamaterials allows the desired index profiles to be designed and fabricated. The thickness of the metamaterial may be achieved using one or more planar dielectric substrates or other unit cell layers. The required thickness may be constrained by the electromagnetic wavelengths or other parameter, such as the desired transformation of the beam. For example, a metamaterial may include a plurality of layers, such as 2-20 layers, more particularly 3-15 layers.

However, the present invention is not limited to metamaterials. In further examples, the spatial variation in index can be obtained using a three dimensional fabrication technique, for example by layering cubes or other particles of a dielectric, semiconductor, and/or or metallic material(s) on a substrate. Particles may be nanoparticles, such as nanorods or nanodisks. In some examples, nanodroplets, e.g. of liquid crystals, may be included. The spatial distribution of index properties can be obtained for example using compositional variations of the material, e.g. dielectric material, according to the position within the finished transformation lens. The resulting lens may be a monolithic material, for example a monolithic solid material.

Example fabrication techniques include deposition techniques such as chemical deposition, physical deposition, printing (e.g. ink-jet printing), solution casting, spin coating and the like. It should be understood that any appropriate deposition technique may be used. Index profiles may be obtained at the time of deposition, for example using variable compositions, variable radiation exposures, variable dopant concentrations, and the like. In some examples, an index profile may be locked in, e.g. by polymer curing or other process, during or after fabrication.

In some examples, index variations may be obtained using post deposition treatments such as IM beam radiation, radiation processing, heat treatments, and the like. In some examples, a multilayer may be obtained with one or more intermediate layers deposited according to a desired spatial index profile.

Liquid crystal clad near-infrared metamaterials with tunable refractive indices are described in Werner et al., Optics Express, 15(6), pp. 3342-3347 (2007). Examples of the present invention include lenses, such as IR and optical lenses, fabricated using these, similar, or other techniques. A desired index profile can be achieved by cladding thin layers of liquid crystal as a superstrate, substrate, or otherwise disposed around metamaterial elements, and obtaining a desired index profile by adjusting the permittivity of the liquid crystal. Examples include photonic materials with a static or dynamic index profiles achieved by reorientation or other modification of a liquid crystal or other anisotropic material(s), including nanorods, nanodisks, and the like.

In some examples, index profiles may be dynamically adjusted using electrodes on or within a flat lens, for example using a photorefractive medium or adjustable metamaterial. However, most examples of the present invention do not use electrodes or photorefractive media.

Further Aspects

Examples of the present invention include lenses formed from a flat slab of material, having first and second parallel planar surfaces, formed using a positive refractive index material. In some examples, a plane wave entering the lens through the first surface is transformed into a converging beam leaving the lens from the second surface. Radiation diverging from an electromagnetic source, for example an antenna or other electromagnetic radiative element, can be converted into a plane wave, or other substantially non-diverging wave, using a flat lens according to an example of the present invention. In other examples, divergence of radiation from a source may be reduced using a lens according to the present invention.

In other examples, a lens maybe formed so that radiation originating from a radiative element on one side of the lens is focused to a point on the other side of the lens. For the first time, this is possible using a flat lens without the need for use of negative materials. Examples include materials having positive refractive index and/or positive magnetic permeability.

In some examples, a radiative source is embedded inside a transformation medium, so that a radiated cylindrical or spherical wave from the source can be converted into planar waves radiating away from the transformation medium, for example in the form of a flat lens. This configuration allows improved radiative source devices to be achieved, including improved radar devices, improved IR transmitters, improved optical devices and the like.

In some examples, a lens can be configured so as to produce a planar wave front using cylindrical or spherical radiation produced by an electromagnetic source lying outside the transformation lens. Improved radar apparatus can be fabricated using examples of the present invention, allowing highly directive radiation to be obtained from an improved antenna. In some examples, the directed radiation maybe scanned over a target volume.

In some examples, a pair of lenses can be combined, for example a first transformation lens converting a circular wave front to a planar wave front, and a second transformation lens converting the planar wave front back through a circular wave front. The combination of lenses may be formed as a unitary device. In other examples two lenses maybe substantially adjacent, or spaced apart so that a planar wave can propagate from one lens to the other before being focused back to a point.

Examples of the present invention include flat lens, formed from a parallel sided slab of material. The outer periphery may be chosen as desired for example having a circular or rectangular form. Hence the lens may be a flat disc of material, or other flat slab of material.

In some examples, a flat slab of optical material, such as glass having an internal index profile, can be used to obtain focusing of optical radiation. Such lenses allow a more convenient and practical lens shape, for example a lens having planar parallel entrance and exit surfaces. Flat lenses can also allow a higher transmitted power of radiation than conventional curved lenses, for example for a better matching to be achieved. The deposition of index matching layers on a flat substrate is facilitated by the flat surface, and index matching over the extent of the lens is improved, lowering reflective and other losses and improving power transmission.

A flat focusing lens has not previously been achieved using positive materials. Example lenses, such as flat lenses, have an interior index profile allowing refraction and focusing to be achieved. Lenses may be flat (e.g. what may be referred to as a plano-plano lens with parallel flat surfaces). Lenses can provide conversion between diverging, planar, and converging electromagnetic waves (such as RF and light waves) without the use of curved exterior surfaces.

Lenses may be designed using coordinate transformation theory to give mathematical expressions for variation of material properties within the lens. Lenses can be manufactured using metamaterials, nanofabrication techniques (e.g.

using dielectric particles), or other suitable methods. Examples are not limited to flat lenses. Feature sizes of metamaterials may be related to wavelengths of operation. Lens functions (e.g. plane wave to cylindrical wave) have not been previously possible with a flat lens of positive material.

Flat lenses according to examples of the present invention can be more practical than conventional curved lenses. Using fabrication technology for anisotropic materials, flat lenses according to examples of this invention can replace conventional curved lenses in any application. Flat lenses utilizing negative-index materials are too lossy for practical lensing applications. Examples of the present invention do not require negative materials. Lenses according to the present invention may include planar input and output faces, the input face showing no appreciable reflection, or reflection reduced substantially compared with conventional curved lenses.

In some examples, modification of the radiation properties (such as divergence or convergence) is substantially independent of lens surface curvature. Lens faces allow entry and exit of radiation, but need not be configured to achieve a desired beam modification. This manipulation of wave propagation can be achieved using an index profile, for example an internal spatial variation of electric and/or magnetic parameters, and may be substantially independent of the geometrical interface between air or other exterior medium (such as water) and the lens material. By designing the index profile as desired, the direction and/or divergence (or correspondingly, convergence) of wave propagation can be manipulated. Planar beams may be obtained from point or line sources. Lenses may be solid and monolithic, for example a monolithic solid dielectric material, for example manufactured using glass, other dielectrics such as oxides, plastic, metal, semiconductor, or other material appropriate for the desired electromagnetic operational range. Anisotropic lens materials may be used, such as crystalline materials, ferroelectrics, electrooptical materials, liquid crystals (monomer, polymer, polymer dispersed), or other materials.

Patents or publications mentioned in this specification are herein incorporated by reference to the same extent as if each individual publication was specifically and individually indicated to be incorporated by reference.

The invention is not restricted to the illustrative examples described above. Examples described are exemplary, and are not intended to limit the scope of the invention. Changes therein, other combinations of elements, and other uses will occur to those skilled in the art. The scope of the invention is defined by the scope of the claims.

The invention claimed is:

1. An apparatus, the apparatus including a lens configured to allow electromagnetic radiation to pass through the lens, the lens having a first face and a second face, and being formed of a lens material, the first face and second face each being planar, the lens having an internal index profile configured to produce a predetermined convergence or divergence of electromagnetic radiation passing through the lens from said first face to said second face, the internal index profile anisotropically and/or inhomogeneously structured in three dimensions to represent a coordinate transformation in three dimensions, said coordinate transformation being a mathematical transformation from a pre-existing first geometry of curved spatial volume to a second geometry of planar spatial volume or vice versa, said second spatial volume bound by said first face and said second face, modification of the radiation beam being achieved through the internal index profile within the lens material.

2. The apparatus of claim 1, the first face and the second face being generally parallel.

3. The apparatus of claim 2, the lens being formed from a parallel-sided slab of the lens material, the lens material being a positive index material.

4. The apparatus of claim 1, the lens having an internal index profile configured to diverge electromagnetic radiation passing through the lens.

5. The apparatus of claim 1, the lens having an internal index profile configured to converge electromagnetic radiation passing through the lens.

6. The apparatus of claim 5, the lens being a converging lens operable to focus a parallel beam of radiation to a focal point.

7. The apparatus of claim 5, further including a radiation source, the lens being configured so as to collimate electromagnetic radiation from the radiation source, the apparatus being a directional radiation source.

8. The apparatus of claim 7, the radiation source being an antenna, the apparatus being a directional radar antenna.

9. The apparatus of claim 7, the radiation source being a light source, the apparatus being a directional light source.

10. The apparatus of claim 1, wherein the apparatus is an optical instrument, the lens comprising a parallel-sided slab of optical material.

11. The apparatus of claim 1, wherein the apparatus is a wireless device, the lens comprising a metamaterial.

12. An apparatus, the apparatus including a directional radiation source and a lens configured to allow electromagnetic radiation to pass through the lens, the lens having a first face and a second face, and being formed of a lens material, the first face and second face each being planar, the lens having an internal index profile configured to produce a predetermined convergence of electromagnetic radiation passing through the lens, the internal index profile anisotropically and/or inhomogeneously structured to represent a coordinate transformation mapped from said first from said first face to said second face, said coordinate transformation being a mathematical transformation from a pre-existing first geometry of curved spatial volume to a second geometry of planar spatial volume, said second spatial volume bound by said first face and said second face, the lens being configured so as to collimate electromagnetic radiation from the radiation source, modification of the radiation beam being achieved through the internal index profile within the lens material, the lens being configured so as to produce a radiation having a generally planar wavefront.

13. An apparatus for generating, receiving, or modifying a radiation beam, the apparatus including a lens, the lens comprising a parallel-sided slab of lens material, the lens material having a first planar face configured to receive the radiation beam, and a second planar face configured to output a modified radiation beam, the first planar face and second planar face being parallel to each other, the lens material having an index profile, the index profile being an internal positive index profile pre-configured to converge or diverge the radiation beam as the radiation beam passes through the lens between the first planar face and the second planar face, the index profile anisotropically and/or inhomogeneously structured to represent the coordinate transformation mapped from said first face to said second face, said coordinate transformation being a mathematical transformation from a pre-existing first geometry of curved spatial volume to a second geometry of planar spatial volume, said second spatial volume bound by said first face and second face; modification of the radiation beam being achieved through the index profile within the lens material.

14. The apparatus of claim 13, the apparatus being a radiation source, the lens acting as a collimator.

15. The apparatus of claim 13, the apparatus being a radiation receiver, the lens acting as a focusing element.

16. The apparatus of claim 13, the apparatus being an optical instrument.

17. An apparatus for modifying a radiation beam, the apparatus having a first face and a second face, the first and second faces each being planar, the apparatus being a beam redirection device having an internal index profile configured to redirect the radiation beam along a circular arc within the apparatus, the internal index profile being anisotropically and/or inhomogeneously correlated with the coordinate transformation in three dimensions, said coordinate transformation being a mathematical transformation from a pre-existing first geometry of curved spatial volume to a second geometry of planar spatial volume or vice versa, said second spatial volume bound by said first face and said second face, the radiation beam being redirected through a redirection angle by the internal index profile as the beam travels through the apparatus from the first face to the second face.

18. An apparatus for modifying a radiation beam, the apparatus having a first face and a second face, the first and second faces each being planar, the apparatus having an internal index profile configured to redirect the radiation beam, the apparatus being a beam redirection device, the internal index profile being anisotropically and/or inhomogeneously correlated with a coordinate transformation in three dimensions, said coordinate transformation being a mathematical transformation from a pre-existing first geometry of curved spatial volume to a second geometry of planar spatial volume or vice versa, said second spatial volume bound by said first face and said second face, the radiation beam being redirected through a redirection angle by the internal index profile as the radiation beam travels through the apparatus from the first face to the second face, wherein the beam redirection angle is 90 degrees, and the first face is orthogonal to the second face.

19. A method of making a flat lens for modifying a beam of radiation, the flat lens having a planar input face and a planar output face, the method comprising:
determining a spatial coordinate transformation required to modify the beam of radiation, said spatial coordinate transformation mapped from said planar input face to said planar output face, said coordinate transformation being a mathematical transformation from a pre-existing first geometry of curved spatial volume to a second geometry of planar spatial volume; and making the flat lens having an index profile anisotropically and/or inhomogeneously structured to represent said coordinate transformation.

20. The method of claim 19, wherein the lens is a converging lens.

21. The method of claim 19, wherein the planar input face and the planar output face are parallel to each other, the lens being a parallel-sided slab of positive index material.

* * * * *

UNITED STATES PATENT AND TRADEMARK OFFICE
CERTIFICATE OF CORRECTION

| | |
|---|---|
| PATENT NO. | : 8,699,140 B2 |
| APPLICATION NO. | : 12/474632 |
| DATED | : April 15, 2014 |
| INVENTOR(S) | : Douglas H. Werner et al. |

It is certified that error appears in the above-identified patent and that said Letters Patent is hereby corrected as shown below:

In the Claims

In column 18, line 35, claim 12: After "lens," please insert --from said first face to said second face--

Signed and Sealed this
Twenty-second Day of July, 2014

Michelle K. Lee
*Deputy Director of the United States Patent and Trademark Office*